United States Patent [19]

Nomula et al.

[11] Patent Number: 4,967,286
[45] Date of Patent: Oct. 30, 1990

[54] METHOD AND APPARATUS FOR FORMING A DIGITAL IMAGE ON AN OPTICAL RECORDING DISC

[75] Inventors: Ram R. Nomula, Huntsville, Ala.; Alan B. Hamersley, Anaheim; Gordon Rudd, Woodland Hills, both of Calif.

[73] Assignee: Disctronics Manufacturing, Inc., Huntsville, Ala.

[21] Appl. No.: 283,375

[22] Filed: Dec. 12, 1988

[51] Int. Cl.$^5$ ............................................. G11B 7/00
[52] U.S. Cl. ..................................... 358/342; 358/341
[58] Field of Search ................ 364/518, 521; 340/723; 382/47; 369/122, 111; 358/341, 342, 93, 335, 347; 346/76 L, 135.1

[56] References Cited

U.S. PATENT DOCUMENTS

| | | | |
|---|---|---|---|
| 4,135,203 | 1/1979 | Friedman | 358/93 |
| 4,245,321 | 1/1981 | Gennetten | 364/521 |
| 4,413,323 | 11/1983 | Muller | 364/521 |
| 4,712,185 | 12/1987 | Aoki | 364/521 |
| 4,783,776 | 11/1988 | Ishigaki et al. | 369/122 |
| 4,796,201 | 1/1989 | Wake | 364/521 |
| 4,805,116 | 2/1989 | Liang et al. | 364/521 |

*Primary Examiner*—Robert L. Richardson
*Attorney, Agent, or Firm*—Willian Brinks Olds Hofer Gilson & Lione

[57] ABSTRACT

A method and apparatus for providing a graphical image on an optical recording disc are described. The method includes the steps of storing a digital image in a first coordinate system as a first array of bits in a digital memory, transforming the digital image from the first coordinate system to an angular coordinate system such as polar coordinates to generate a second array of bits, and then using the second array of bits to modulate a writing beam in an optical disc mastering process to write the transformed digital image onto an optical recording disc. The digital image can be obtained alternately from an optical scanner or conventional image preparation software. The method can also include the step of editing an initial array of bits to form the first array of bits.

15 Claims, 6 Drawing Sheets

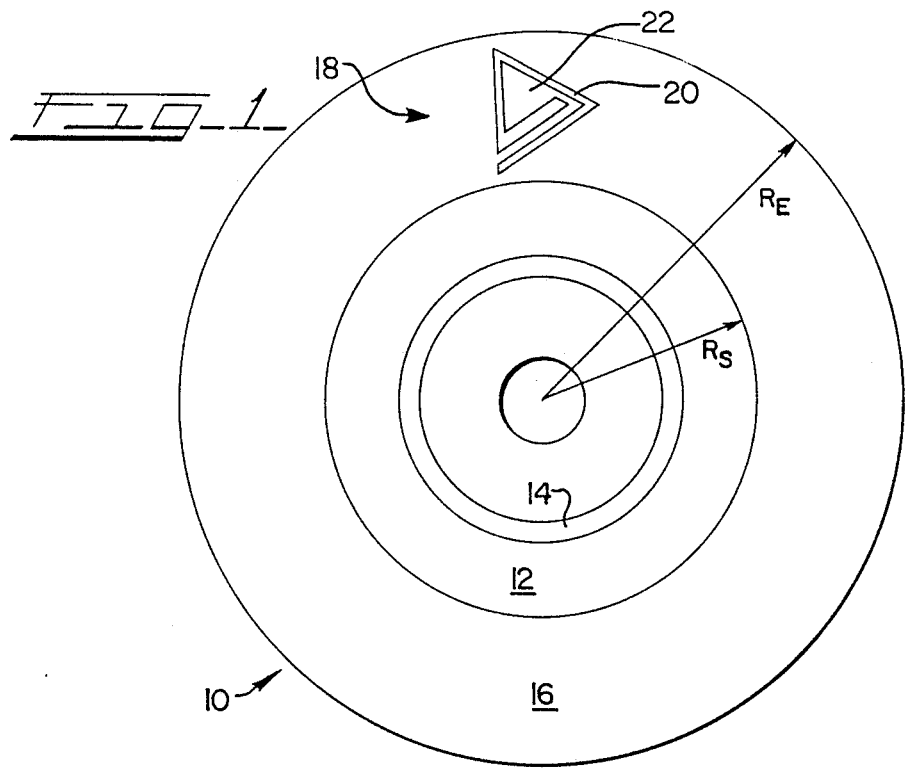
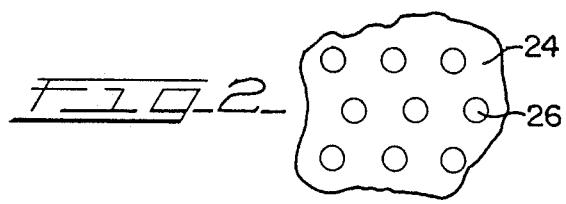
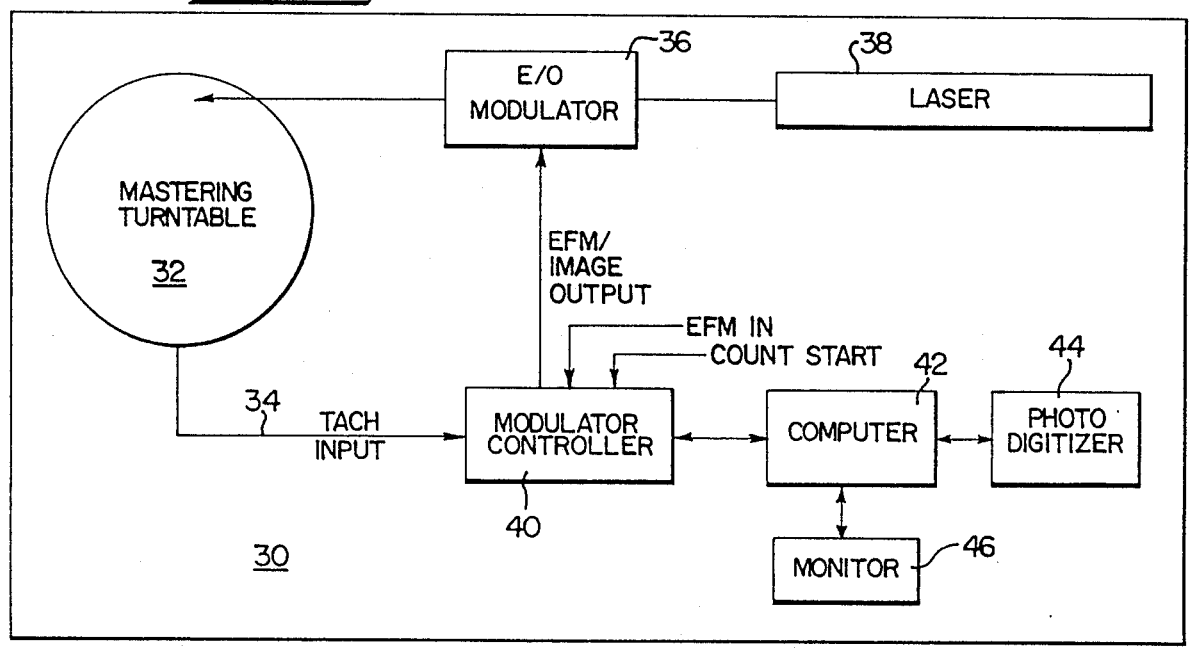

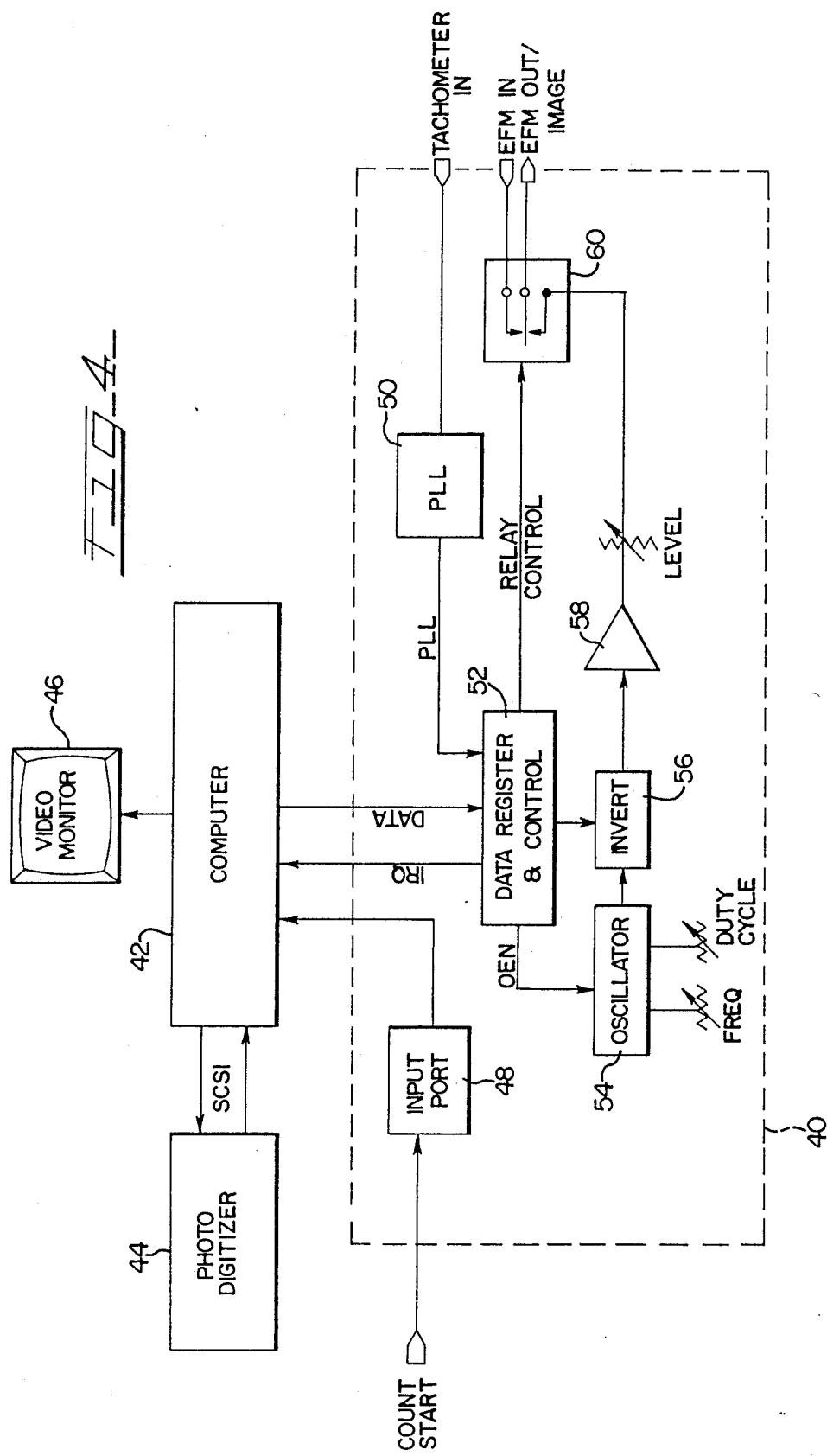

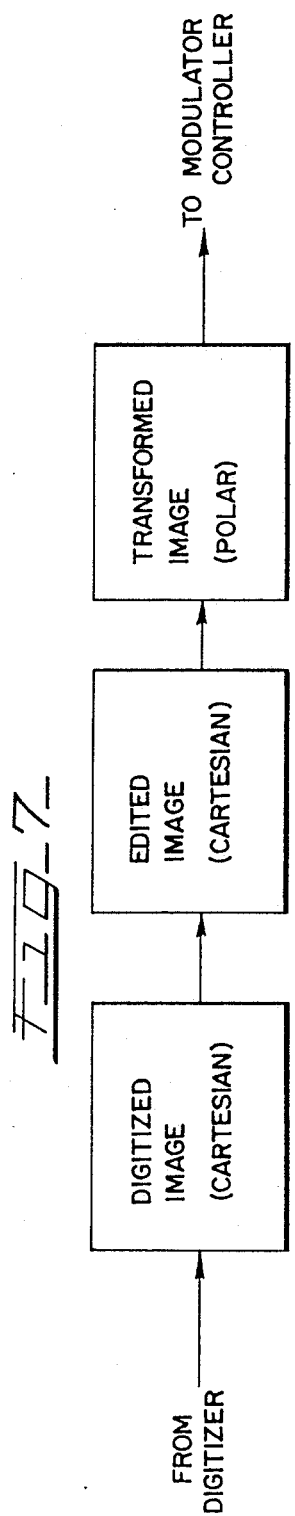

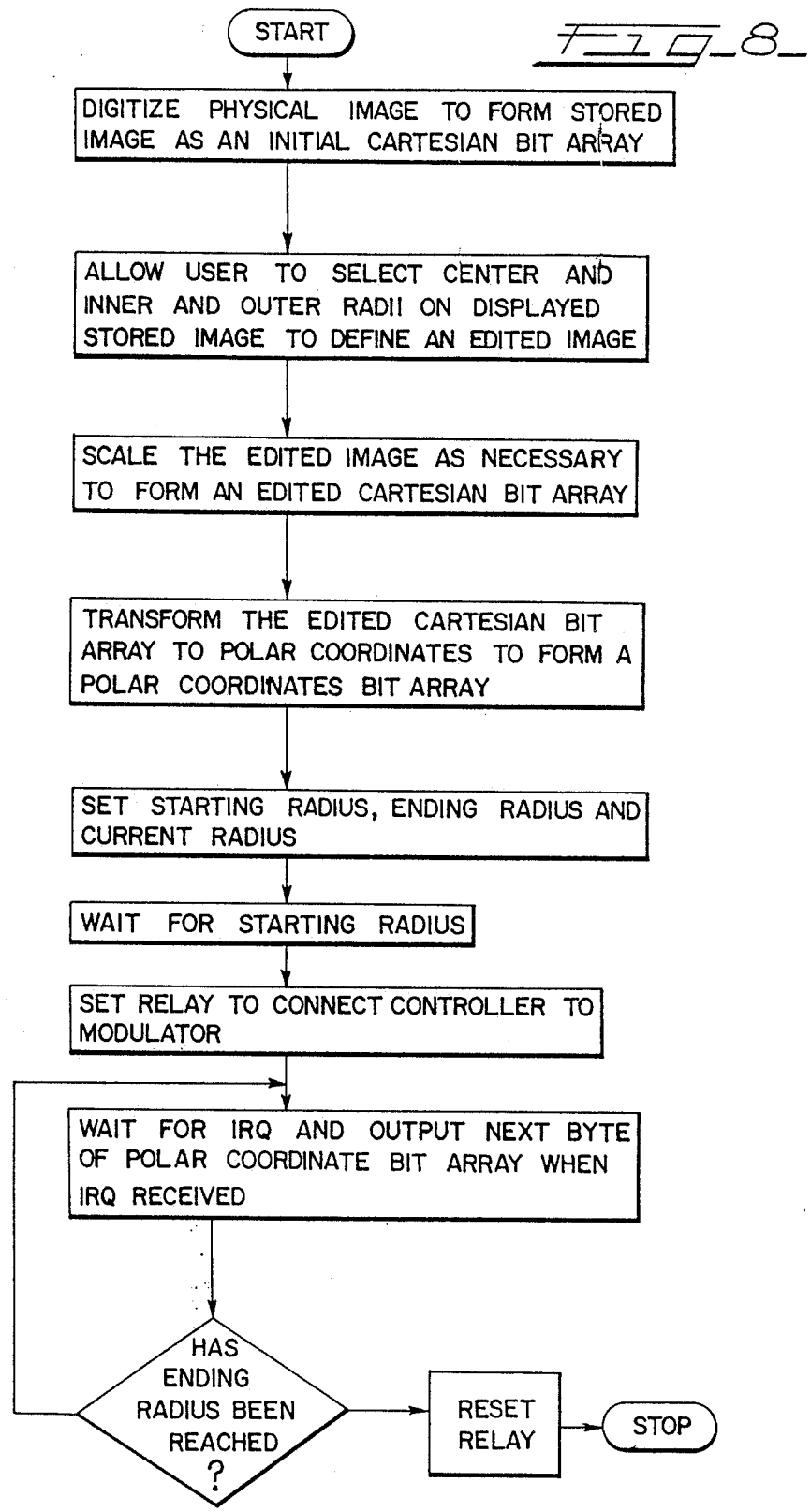
FIG_8

METHOD AND APPARATUS FOR FORMING A DIGITAL IMAGE ON AN OPTICAL RECORDING DISC

BACKGROUND OF THE INVENTION

This invention relates to a method and apparatus for forming an image on an optical recording disc such as an optical disc master.

Optical recording discs such as compact discs have come into widespread use. Typically, a pattern of carefully dimensioned and spaced quarter wavelength pits is formed in a reflective surface in order to encode digital information.

One form of compact disc, known as a CD single, provides reduced playing time, generally up to twenty minutes. When a CD single is formed as a conventionally sized compact disc, this leaves a considerable portion of the area of the disc not devoted to recording audio information.

Recently, this unrecorded area has been used to display graphical images. One approach is to prepare a master by exposing photoresist in a regular pattern of spaced dots throughout the unrecorded area and then to expose selected regions of the unrecorded area through a mask shaped in the desired image thereby removing the regular pattern of exposed photoresist in the selected regions. When the photoresist is developed in the usual way, a graphical image corresponding to the exposed image is left on the master.

This approach brings with it disadvantages because a separate image exposure step is required, which must be done subsequent to conventional mastering.

Conventional compact discs also include human readable text recorded in a diffraction pattern image near the inside radius of the recorded surface. In the past, these letters have been formed during the mastering process with a character generator which modulates the writing beam during the mastering process to form the diffraction image pattern. Such character generators are limited in the number of characters and the complexity of the image that can be produced. For this reason, the character generator approach is not well suited to provide a pleasing graphical display on the relatively large unrecorded area of a CD single.

It is accordingly a principal object of this invention to provide an improved method and apparatus that allows a user to choose a graphical image with great flexibility and ease and to record the graphical image directly on an optical recording disc such as a CD master during the mastering process. In this way, the need for exposure steps following the conventional mastering process is completely eliminated, and excellent graphical images are provided simply and easily.

SUMMARY OF THE INVENTION

According to the method of this invention, a graphical image is provided on an optical recording disc by first storing the digital image in a first coordinate system as a first array of bits in a digital memory. The digital image is then transformed from the first coordinate system to an angular coordinate system to generate a second array of bits which is also stored. The second array of bits is then used to modulate a writing beam in an optical disc mastering process to write the transformed digital image onto the optical recording disc.

According to the apparatus of this invention, a device for storing a graphical image on an optical recording disc comprises means for storing a digital image in a first coordinate system as a first array of bits in a digital memory, and means for transforming the digital image from the first coordinate system to an angular coordinate system to generate a second array of bits. A modulator is provided for modulating a writing beam in an optical disc mastering system, and this modulator is controlled by a controller circuit which is coupled to receive the second array of bits and to control the modulator. The controller circuit operates to control the modulator in response to the second array of bits to write the transformed digital image onto the optical recording disc.

As pointed out in detail below, the presently preferred embodiment allows a physical image to be digitized with a photodigitizer. It then allows the user to edit the image by selecting any desired part of the image and scaling it as appropriate to obtain the desired image on the disc. The edited image is then transformed to angular coordinates such as polar coordinates or spiral coordinates. During the mastering process, successive bytes of the transformed image are supplied to the modulator controller, which uses these bytes in a bit by bit fashion to gate an oscillator. The gated output of the oscillator is then used to control the electro-optical modulator for the laser writing beam. The controller generates interrupt requests that cause the computer to supply successive bytes of the transformed image as needed.

Because the user can easily edit, re-center and scale the image as desired, a user can quickly adjust the image stored in computer memory as appropriate for his intended application. Furthermore, the image being edited does not necessarily originate with a photodigitizer, but can rather be created in other ways, as for example with graphics program packages.

The invention itself, together with further objects and attendant advantages, will best be understood by reference to the following detailed description, taken in conjunction with the accompanying drawings.

BRIEF DESCRIPTION OF THE DRAWINGS

FIG. 1 is a plan view of a compact disc a graphical image produced in accordance with the presently preferred embodiment of this invention.

FIG. 2 is a highly magnified view of a portion of the image bearing surface of the compact disc of FIG. 1.

FIG. 3 is a block diagram of a mastering system which includes a presently preferred embodiment of this invention.

FIG. 4 is a more detailed block diagram of the modulator controller, computer and photodigitizer of FIG. 3.

FIG. 7 is a diagram illustrating the main steps performed by the system of FIG. 3.

FIG. 8 is a flow chart of the program executed by the computer of FIG. 3.

DETAILED DESCRIPTION OF THE PRESENTLY PREFERRED EMBODIMENTS

Figure 5:
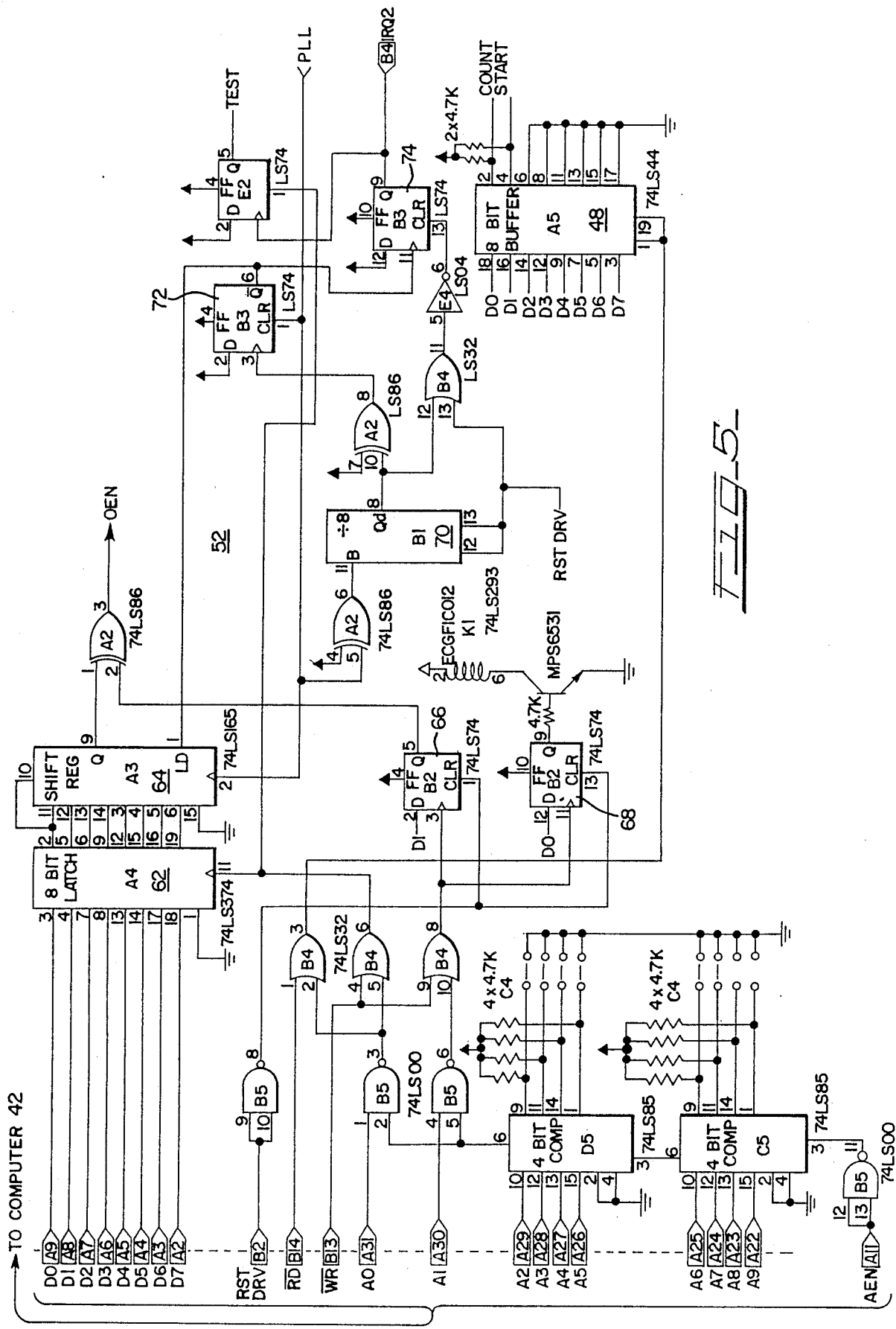
FIG. 5 is a detailed schematic diagram of the data register and control and the input port of FIG. 4.

Turning now to the drawings, FIG. 1 shows an optical recording disc such as a compact disc 10 which bears a graphical image produced in accordance with the embodiment described below. The disc 10 can be either a master or a replica disc. The compact disc 10 includes a recording surface 12 which stores audio information in the conventional manner, a text surface 14 which stores an alphanumeric, human readable text in the conventional manner, and an image surface 16. The image surface 16 extends between a starting radius $R_S$ and an ending radius $R_E$. This image surface 16 bears at least one image 18 which is made up of a foreground 20 on a background 22. In this embodiment one of the foreground and the background 20, 22 is a planar, specular reflecting surface and the other is a reflecting surface that bears an array of pits 26 (FIG. 2). These pits 26 are spaced on a specular reflecting surface 24.

In alternate embodiments the pits 26 can be used to define either the foreground 20 or the background 22. In either case, the surface bearing the pits 26 acts as a diffraction grating to create a multicolor visual effect which contrasts markedly against the specular reflecting surface.

The pits 26 used to define the image 18 are substantially the same in depth as pits used to record audio information in the recording surface 12, and in a replica disc they are formed in the same pressing operation from a master. The system described below forms both the image 18 and the recorded audio information on the recording surface 12 on the master in the same mastering process.

As shown in FIG. 3, a mastering system 30 includes a mastering turntable 32 which includes an encoder that generates 525 pulses per revolution on a tachometer signal line 34. A laser 38 generates a write beam that is modulated by an electro-optical modulator 36. The modulated write beam exposes photoresist selectively on a master rotated on the mastering turntable. Once the photoresist has been exposed, it is developed and used to complete fabrication of the master. The master is then used in conventional pressing steps to form replica compact discs.

The features of the mastering system 30 described above are conventional in the art and do not per se form part of this invention. They will therefore not be described in greater detail here.

According to this invention, a modulator controller 40 is provided which is controlled by a computer 42 coupled to a photodigitizer 44 and a monitor 46 (FIGS. 3 and 4). The modulator controller receives a conventional EFM signal as an input and, when the modulator controller is inactive, it simply passes the unaltered EFM signal to the modulator 36. When the modulator controller 40 is used to write a graphical image on the master, the controller 40 is controlled by the computer 42 and it supplies graphical information on the EFM/image output.

FIG. 4 shows a more detailed block diagram of the modulator controller 40. As shown in FIG. 4, the controller 40 includes an input port 48 that receives a control signal Count Start and supplies it to the computer 42. The controller 40 also includes a phase locked loop 50 that responds to the tachometer signal and produces a signal PLL at eight times the frequency of the tachometer signal. Thus the PLL signal is generated 4200 times per revolution of the turntable 32. PLL is used to sequence a data register and control circuit 52 that receives image data from the computer 42 and generates an oscillator control signal OEN that controls operation of an oscillator 54. The oscillator 54 when enabled provides a 1 MHz square wave signal of approximately 50% duty cycle through an inverting switch 56 and a driver 58 to the contacts of a relay 60. During times when the controller 40 is inactive the relay 60 interconnects the incoming EFM signal with the outgoing EFM/image control signal. When the controller 40 is used to output an image, the relay 60 is controlled to supply the output signal generated by the driver 58 to the output EFM/image out terminal.

Figure 6:
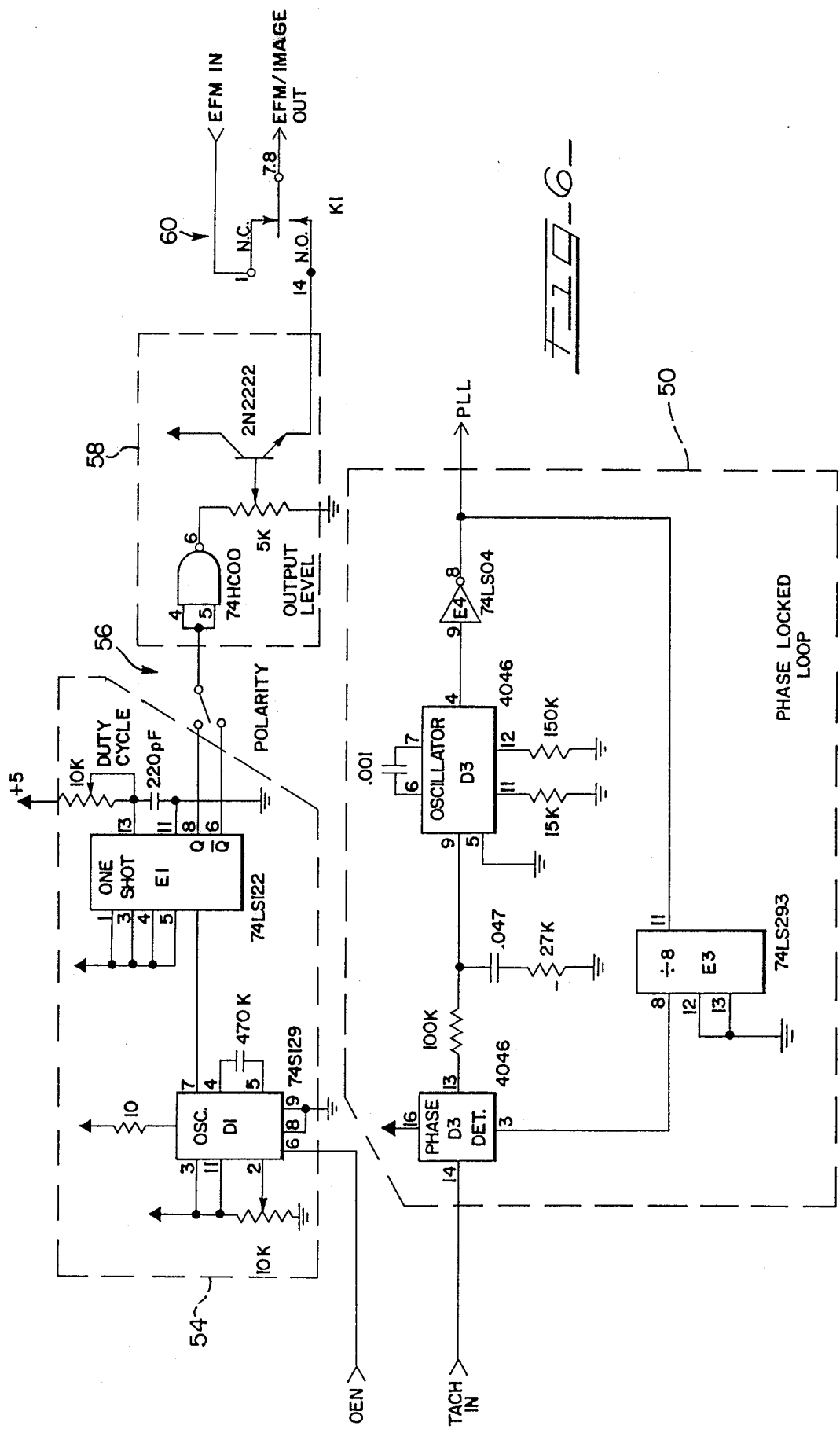
FIG. 6 is a detailed schematic diagram of the phase locked loop, oscillator and related components of FIG. 4.

FIGS. 5 and 6 are detailed schematic diagrams of the controller 40. FIG. 6 provides details regarding the presently preferred construction for the oscillator 54, the inverter 56, the driver 58, the relay 60 and the phase locked loop 50. In this embodiment the inverter 56 is a manually controlled slide switch. The remaining elements are conventional circuit elements which do not require further description here, other than to say that the oscillator 54 can be adjusted as to frequency and duty cycle and the driver 58 can be adjusted as to output level in order to provide a visually appealing diffraction image with the specific modulator 36 used.

FIG. 5 shows a detailed circuit diagram of the remaining portions of the controller 40. Briefly stated, a conventional addressing circuit is used to latch an 8 bit byte of data from the computer 42 in an 8 bit latch 62 under computer control. Periodically, data latched in the latch 62 is loaded in parallel into a shift register 64, as described in greater detail below. With every cycle of PLL (which occurs with a frequency 8 times that of the tachometer signal) a bit is shifted out of the shift register 64 to form an oscillator enable signal OEN, which is used to gate the oscillator 54. A flip-flop 66 allows the computer 42 to select the polarity of OEN. Another flip-flop 68 allows the computer 42 to control the state of the relay 60. A divide by 8 circuit 70 counts cycles of PLL and every eighth cycle controls the flip-flop 72 to change state. The flip-flop 72 causes a shift register 64 to load a new byte of data from the latch 62. The flip-flop 72 simultaneously causes the flip-flop 74 to generate an interrupt request signal on IRQ2 which is applied to the computer 42. As explained below, the computer 42 responds to the interrupt request by loading a new byte of data into the latch 62.

For example, if the byte 10000001 is loaded into the latch 62, the controller 40 turns on the oscillator 54 for the first and eighth cycles of PLL and turns off the oscillator 54 for cycles two through seven. When the oscillator 54 gates the oscillator output to the modulator 36, the modulator 36 writes an array of closely spaced exposed areas onto the master on the mastering turntable 32. These exposed areas, when developed in the conventional manner, provide a region on the master that will generate an array of pits as shown in FIG. 2.

Simply by way of example in order better to define the presently preferred embodiment of this invention, the computer 42 can be an IBM PC having 256K memory, two floppy disc drives, a 20M byte fixed disc and an 8087 math coprocessor. The photodigitizer for example can be of the type marketed by DEST as a 200 dots per inch PC-SCAN photodigitizer or optical scanner.

From this description it should be apparent that the computer 42 transfers digital information to the controller 40 on a byte by byte basis, and that the controller 40 converts these bytes into a stream of bits which are used to successively modulate the oscillator 54. Of course, conventional means (not shown) are used to move the writing beam radially across the mastering turn table 32 to record a spiral track on the master being formed.

Having described the physical structure of the mastering system of this embodiment, the operations performed by the computer 42 can now be discussed. A presently preferred embodiment of the program executed by the computer 42 is shown in the attached appendix. That appendix defines the principal disclosure of this program, and the following flow charts and description are merely intended to summarize the primary disclosure of the listing.

FIG. 7 is a flow diagram that shows the general flow of information in the program executed by the computer 42. In this embodiment an image is digitized on the photodigitizer 44 to form a stored digitized image in Cartesian coordinates. This digitized image is then edited by the user as described below to form an edited image in Cartesian coordinates. This edited image is then transformed into angular coordinates such as polar or spiral coordinates. The transformed image is then output to the modulator controller on a byte by byte basis, and the modulator controller controls the modulator as described above to expose the photoresist on the master in the desired pattern.

FIG. 8 shows the general flow chart of the program executed by the computer 42. In this embodiment the first step is to digitize a physical image with the photodigitizer 44 to form a stored image as an initial Cartesian bit array. Preferably, art work to be digitized is 8½" by 8½" in black and white, preferably with no grey levels. The artwork is scanned by the photodigitizer 44 at 200 lines per inch resolution to generate 1712×1712 pixels or 358K bytes. The digitized image is stored in a run-length-limited format.

The photodigitizer 44 is controlled by software supplied by the manufacturer of the photodigitizer, in this embodiment DEST PUBSPAC software. The preferred embodiment uses the default settings of the photodigitizer. This stores the image as a run-length-limited data file. Once this initial Cartesian bit array has been stored the user can edit the image as appropriate for the particular application. Once "E" is selected on the main menu the program prompts the user to name the picture file to edit. It then loads the image into memory and displays it on the screen. Two circles are superimposed over the display to indicate the inner and outer diameters of the disc. The outer circle corresponds to a radius of 60 mm and the inner circle corresponds to a radius of 25 mm. Cross-hairs are displayed on the screen, and the user is prompted to locate the point to be used for the center of the disc. This is accomplished by moving the cross-hairs using the arrow keys on the numeric keypad. In addition to moving left, right, up and down, the cross-hairs can be moved diagonally by using the 7, 9, 1 and 3 keys. The speed and resolution of the cursor movement can also be controlled using function keys F1 and F2.

Initially, the cursor moves in large steps so that the user may quickly get to the desired position. In order to position the cursor more accurately, the steps can be made smaller by pressing F2. Similarly, F1 makes the steps bigger for faster movement. Once the desired center of the image has been located, carriage return is pressed. This causes the computer to redraw the image in its new position If this position is satisfactory, the Y key can be used to store this position Otherwise, the user may press N and repeat the process.

The program now prompts the user to locate the outer edge of the image. This is accomplished in the same way as centering by moving cross-hairs to a location which corresponds to the desired outer edge of the disc. Any point on the image may be selected, including points outside the image area. In this way images can be made smaller as well as larger. After hitting carriage return, the new outer radius is indicated by a circle. This process can be repeated as often as necessary. When the desired result is obtained the user enters Y in response to the prompt and the image is now reformed and written back to the disc file.

Before the image is output to the modulator controller it is transformed to angular coordinates, in this embodiment polar coordinates. In this embodiment this transformation is done before the output process in order to avoid the delays associated with real time data processing.

Image transformation is selected by pressing "T" from the main menu. After the name of the picture file to be transformed is entered, the picture file will be loaded into memory, and displayed on the screen. The transformation process takes about 90 minutes in this embodiment.

Once the image has been transformed to polar coordinates it is ready to be output to the controller. The outputting function is selected by the letter "O" on the main menu along with the name of the picture to be output. The program prompts the user to enter a starting radius, an ending radius and a current radius. The appropriate values in millimeters should be entered. The starting radius $R_S$ is the radius at which the relay 60 will be controlled to replace the conventional EFM signal with the image signal generated by the controller 40 The ending radius $R_E$ is normally the outer diameter of the disc or 60.0 mm.

The current radius is the radius at which the disc mastering machine is at present. This is required to let the system know where the writing beam is positioned. Once this is known the system remains in synchronization by counting tachometer pulses. Of course, the mastering turntable must be running at the time the current radius is entered, and the turntable cannot be stopped afterwards without losing synchronization. This step can be made automatic by supplying a pulse to the Count Start input of the system at a radius of 23 mm. The system starts as soon as the carriage return key is hit after current radius. The computer automatically begins controlling the modulator with the desired image when the starting radius is reached, and it deactivates the relay 60 when the ending radius is reached. During this period the computer 42 waits for an interrupt request. In response to each interrupt request it outputs the next byte of the polar coordinate bit array to the controller 40. As explained above, the controller 40 receives each byte in parallel and then serially shifts the bits of the byte out of a shift register to control the oscillator 54.

From the foregoing description it should be apparent that a highly flexible and useful system has been described which allows a wide selection of graphical inputs to be used. The editing features make it possible for the user to scale and orient the image as desired in a simple way. The transformation from Cartesian to polar coordinates allows the image data to be output in real time without excessive demands on the speed of operation of the hardware. The controller 40 requests individual bytes of data from the computer 42 via an interrupt request and in this way ensures timely transmission of successive bytes of data. The entire process is integrated with a conventional mastering system such that no subsequent processing steps are required to write the desired image onto the master being formed in the conventional manner.

The system described above provides a resolution of 283 lines per inch at the outside of the disc. At the inside of the disc the angular resolution is the same so that there are now 679 lines per inch. In the radial direction the resolution is fixed at 48 times the track pitch of 1.6 microns (which is about 0.08 mm). The data records are 525 bytes long and represent one ring of data. The pixels are 0.088 degrees×0.08 mm. The radial dimension is fixed, but the circumferential dimension increases with radius. The length at the inside radius of each pixel is about 0.04 mm and at the outside radius about 0.10 mm.

Of course, it should be understood that a wide range of changes and modifications can be made to the preferred embodiment described above. Polar coordinates are not essential, and it may be preferable in some applications to use other angular coordinates such as spiral coordinates in which the entire data record is arranged as a one dimensional array. The term "angular coordinate system" is used here to refer to coordinate systems where adjacent pixels at substantially the same radius from the center are readily selected from an array. Polar and spiral coordinate systems are two systems that are particularly well suited for use as angular coordinate systems.

As suggested above, it is not essential in all embodiments that the initial image be obtained from a physical image with a photodigitizer. Instead, the original image can be obtained in other ways, as for example with computer graphics programs Of course, details of circuitry and programming used to implement the basic functions described above can readily be modified to suit the intended application, and this invention can be used with a wide variety of mastering machines.

It is therefore intended that the foregoing detailed description be regarded as illustrative rather than limiting, and that it be understood that it is the following claims, including all equivalents, which are intended to define the scope of this invention.

We claim:

1. A method for providing a graphical image on an optical recording disc comprising the following steps:
   (a) storing a digital image in a first coordinate system as a first array of bits in a digital memory;
   (b) transforming the digital image from the first coordinate system to an angular coordinate system to generate a second array of bits and storing the second array of bits; and
   (c) using the second array of bits to modulate a writing beam in an optical disc mastering process to write the transformed digital image onto an optical recording disc.

2. The method of claim 1 wherein step (a) comprises the following steps: digitizing a physical image with an optical scanner to form an initial array of bits; and editing the initial array of bits to form the first array of bits.

3. The method of claim 2 wherein the editing step comprises the following steps:
   selecting a portion of the initial array of bits centered on a selected point; and
   scaling the selected portion of the initial array to a desired scale to form the first array of bits.

4. The method of claim 1 wherein the angular coordinate system is a polar coordinate system.

5. The method of claim 4 wherein the first coordinate system is a Cartesian coordinate system.

6. The method of claim 1 wherein step (c) comprises the steps of supplying the second array of bits to a modulator controller on a byte basis in response to an interrupt request generated by the modulator controller.

7. The optical recording disc produced by the method of claim 1.

8. A replica disc formed with the optical recording disc of claim 7.

9. An apparatus for storing a graphical image on an optical recording disc, comprising;
   means for storing a digital image in a first coordinate system as a first array of bits in a digital memory;
   means for transforming the digital image from the first coordinate system to an angular coordinate system to generate a second array of bits and for storing the second array of bits;
   a modulator for modulating a writing beam in an optical disc mastering system; and
   a controller circuit coupled to receive the second array of bits and to control the modulator, said controller circuit operative to control the modulator in response to the second array of bits to write the transformed digital image onto an optical recording disc.

10. The apparatus of claim 9 further comprising;
    means for digitizing a physical image with an optical scanner to form an initial array of bits; and
    means for editing the initial array of bits to form the first array of bits.

11. The apparatus of claim 10 wherein the editing means comprises:
    means for selecting a portion of the initial array of bits centered on a selected point; and
    means for scaling the selected portion of the initial array to a desired scale to form the first array of bits.

12. The apparatus of claim 9 wherein the angular coordinate system is a polar coordinate system.

13. The invention of claim 12 wherein the first coordinate system is a Cartesian coordinate system.

14. The apparatus of claim 9 wherein the apparatus further comprises means for transmitting the second array of bits to the controller circuit in bytes, and wherein the controller circuit comprises means for storing the bytes.

15. The apparatus of claim 14 wherein the apparatus further comprises means, responsive to an interrupt request signal, for causing the transmitting means to transmit a byte, and wherein the controller circuit comprise means for periodically generating the interrupt request signal.

* * * * *